US011887742B2

(12) United States Patent
Massar et al.

(10) Patent No.: US 11,887,742 B2
(45) Date of Patent: Jan. 30, 2024

(54) COLD SPRAYED RADIATION SHIELDING

(71) Applicant: Worcester Polytechnic Institute, Worcester, MA (US)

(72) Inventors: Christopher J. Massar, Monroe, CT (US); Bryer C. Sousa, Worcester, MA (US); Danielle L. Cote, Acton, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 58 days.

(21) Appl. No.: 17/579,042

(22) Filed: Jan. 19, 2022

(65) Prior Publication Data

US 2022/0328206 A1 Oct. 13, 2022

Related U.S. Application Data

(60) Provisional application No. 63/168,952, filed on Jan. 19, 2021.

(51) Int. Cl.
*G21F 1/02* (2006.01)
*G21F 1/10* (2006.01)

(52) U.S. Cl.
CPC .............. *G21F 1/026* (2013.01); *G21F 1/106* (2013.01)

(58) Field of Classification Search
CPC ................................ G21F 1/026; G21F 1/106
USPC ......... 250/505.1, 506.1, 507.1, 515.1, 516.1, 250/517.1, 518.1, 519.1
See application file for complete search history.

(56) References Cited

U.S. PATENT DOCUMENTS

2020/0152343 A1 * 5/2020 Farmer .................. C23C 4/134

FOREIGN PATENT DOCUMENTS

| | | | |
|---|---|---|---|
| DE | 60327505 | | 6/2009 |
| EP | 1431413 | B1 | 12/2003 |
| JP | 6125827 | B2 | 5/2017 |
| KR | 1020140122579 | A | 10/2014 |
| RU | 2232438 | C2 | 7/2004 |
| RU | 2446490 | C2 | 3/2012 |

OTHER PUBLICATIONS

International Search Report, PCT/US2022/012938, dated Nov. 10, 2022, pp. 1-7.

* cited by examiner

*Primary Examiner* — Nicole M Ippolito
(74) *Attorney, Agent, or Firm* — Armis IP Law, LLC

(57) ABSTRACT

Radiation shield and methods for manufacturing a radiation shield are provided herein, the method includes identifying a substrate for the radiation shield; identifying at least one material for cold spraying on the substrate; applying by cold spray a coating of the at least one material on the substrate thereby obtaining a radiation shield. The radiation shield is lighter, thinner, and more efficient compared to conventional radiation shields.

19 Claims, 2 Drawing Sheets

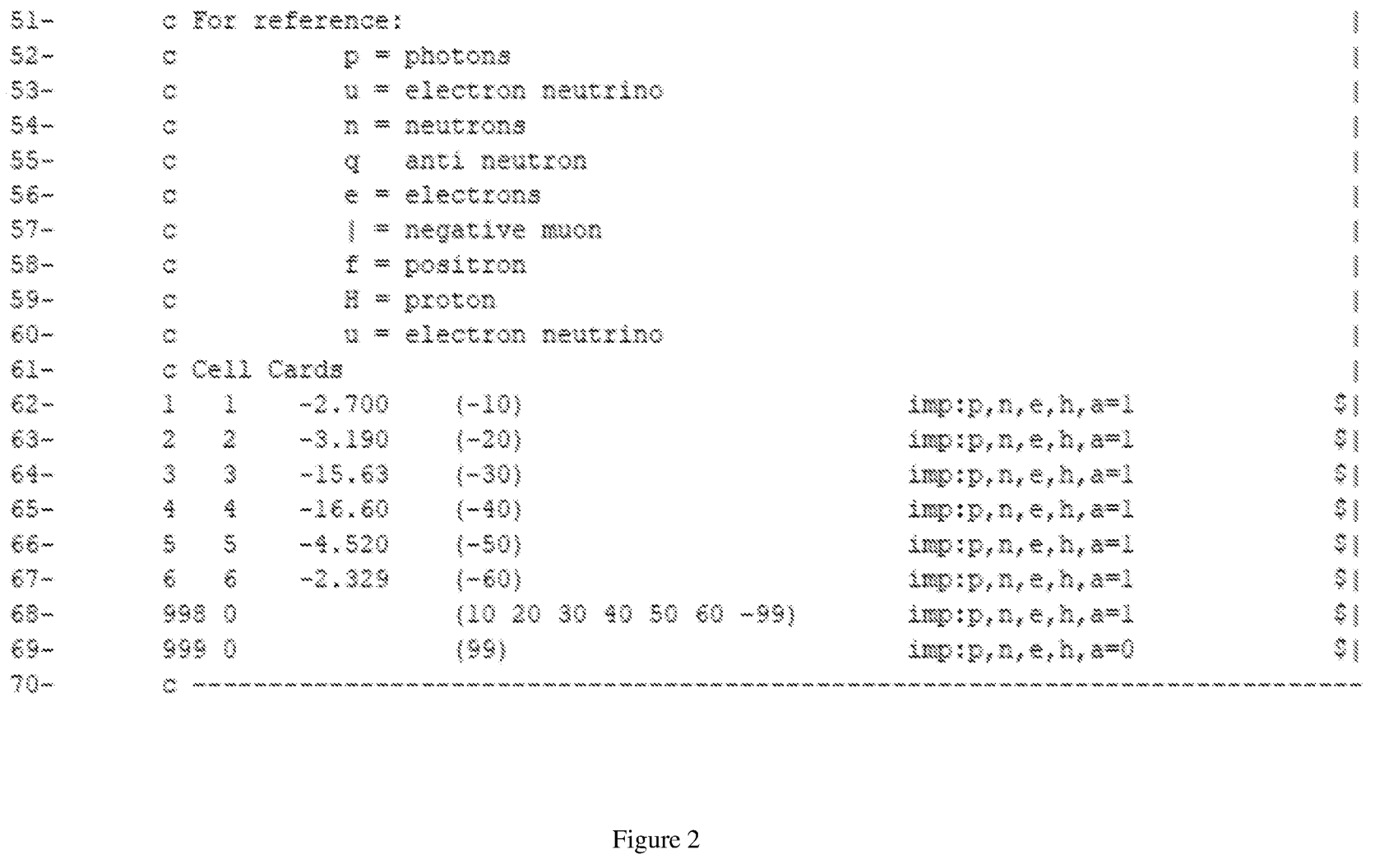

```
c For reference:                                                               |
c           p = photons                                                        |
c           u = electron neutrino                                              |
c           n = neutrons                                                       |
c           q   anti neutron                                                   |
c           e = electrons                                                      |
c           | = negative muon                                                  |
c           f = positron                                                       |
c           H = proton                                                         |
c           u = electron neutrino                                              |
c Cell Cards                                                                   |
1   1    -2.700    (-10)                         imp:p,n,e,h,a=1             $|
2   2    -3.190    (-20)                         imp:p,n,e,h,a=1             $|
3   3    -15.63    (-30)                         imp:p,n,e,h,a=1             $|
4   4    -16.60    (-40)                         imp:p,n,e,h,a=1             $|
5   5    -4.520    (-50)                         imp:p,n,e,h,a=1             $|
6   6    -2.329    (-60)                         imp:p,n,e,h,a=1             $|
998 0              (10 20 30 40 50 60 -99)       imp:p,n,e,h,a=1             $|
999 0              (99)                          imp:p,n,e,h,a=0             $|
c -----------------------------------------------------------------------------
```

Figure 2

COLD SPRAYED RADIATION SHIELDING

RELATED APPLICATION

This application claims priority to U.S. provisional application No. 63/138,952 filed Jan. 19, 2021, entitled "Cold Sprayed Radiation shielding" by inventors Christopher J. Massar, Derek G. Tsaknopoulos, Bryer C. Sousa, Kyle Tsaknopoulos, and Danielle L. Cote which is hereby incorporated by reference herein in its entirety.

BACKGROUND

Galactic cosmic radiation (GCR) is predominantly composed of protons. GCR constitutes about 87% protons, 12% alpha particles and the balance is heavier nuclei, accounting for 1% and electrons at 2% [Simpson, 1983]. The cosmic rays display an energy spectrum in which the bulk of appreciable threatening particles has energies ranging from $10^{10}$ to $10^{15}$ GeV. Protons are the primary cause of damage to space vehicles because of their sheer volume, and unlike x-rays and gamma rays, protons are low linear transfer (LET) particles. LET particles are known to pass through materials, and they do not lose a significant portion of their energy while doing so. LET particles is an example of a charged particle that causes damage to electronics which may be critical to mission success in protecting our warfighters and military personal overseas and beyond.

There have been hundreds of case histories of failures and anomalies from 1974-1994 [Bedingfield, Alexander, 1996] and even more recently impacting missions, including the Near Infrared Multi-Object Spectrograph (NIRSpec) for the James Webb Space Telescope (JWST) and the atomic force microscope (AFM) on the Phoenix Mars mission [Shea, 2011] due to GCR.

Radiation, specifically GCR, causes millions of dollars worth of damage to high-reliability space vehicles that provide commercial services like phones, internet, and GPS access. More concerning is that the satellites responsible for protecting our nation and its allies through intelligence, reconnaissance, and surveillance (ISR) are subject to the same damaging radiation.

Radiation shielding is an essential aspect of cosmic developments such as satellite technology, planetary research, and space travel. The Earth's magnetic field substantially shields radiation from reaching the surface of the earth. However, space exploration requires protection from constant radiation from the Sun and other celestial bodies.

There is a need for a lightweight and highly effective GCR shield that protects micro-electromechanical systems (MEMS) in aerospace vehicles and space-based industries, thereby solving critical problems plaguing the aerospace industry.

SUMMARY

An aspect of the invention described herein provides a method for manufacturing a radiation shield, for example a GCR shield, the method including identifying a substrate for the radiation shield; identifying at least one material for cold spray deposition onto the target substrate, and applying the cold spray materials consolidation process to produce additively manufactured coatings or consolidations of at least one functional feedstock material upon the substrate thereby obtaining a radiation shield.

An embodiment of the method further includes applying a plurality of coatings of at least one material on the substrate. An embodiment of the method further includes transforming the at least one material in a powder blend. Another embodiment of the method further includes applying a binder on the substrate prior to applying the at least one material.

In an embodiment of the method, identifying the at least one material further includes identifying at least one hard base material and at least one soft base material. For example, the material is an electron dense material. An embodiment of the method further includes cold spray consolidation onto the substrate the coating of at least one of: the soft base material, and the hard base material. An embodiment of the method further includes layering the coating of the soft base material followed by the coating of hard base material.

In an embodiment of the method, the substrate is at least one selected from: aluminum, tungsten, tin, lead, bismuth, zinc, and alloys thereof. In some embodiments of the method, the soft base material for cold spraying is at least one selected from: copper, tungsten, aluminum, titanium, iron, magnesium, manganese, tantalum, chromium, europium, gallium, indium, thallium, nihonium, flerovium, moscovium, livermorium, cobalt, nickel, zinc, platinum, silver, gold, and alloys thereof.

In some embodiments of the method, the hard base material for cold spraying is at least one selected from: silicate, carbide, boride, nitride, silicon, boron, germanium, arsenic, antimony, tellurium, polonium, and combinations thereof.

An aspect of the invention described herein provides a radiation shield, including a substrate having a cold sprayed coating of at least one material. In an embodiment of the radiation shield, the substrate is selected from: an aluminum alloy, a titanium alloy, a lead alloy, stainless steel, a copper alloy, a brass alloy, and any combination thereof. In some embodiment of the radiation shield, the aluminum alloy is selected from: Al 1420, Al 1421, Al 2004, Al 2017, Al 2020, Al 2024, Al 2029, Al 2055, Al 2080, Al 2090, Al 2091, Al 2095, Al 2099, Al 2195, Al 2519, A12055, A15024, A15052, A15652, A12055, A16013, A16061, A16113, A17010, Al 7039, Al 7049, Al 7050, Al 7055, Al 7065, Al 7068, Al 7075, Al 7175, Al 7085, Al 7093, Al 7150, Al 7178, Al 7255, Al 7475, Al 8009, and Al 8019.

In some embodiments of the radiation shield, the aluminum alloy has a thickness of: 0.01 mm to 0.1 mm, from 0.1 mm to 1 mm, from 1 mm to 2 mm, from 2 mm to 3 mm, 3 mm to 4 mm, 4 mm to 5 mm, or 5 mm to 10 mm. In an embodiment of the radiation shield, the cold spray coating has a thickness of: 0.01 mm to 0.1 mm, from 0.1 mm to 0.5 mm, from 0.5 mm to 1 mm, from 1 mm to 1.5 mm, from 1.5 mm to 2 mm, from 2 mm to 3 mm, 3 mm to 4 mm, 4 mm to 5 mm, or 5 mm to 10 mm. In some embodiments of the radiation shield, the material further includes a hard base material and a soft base material. In an embodiment of the radiation shield, the material further includes a radiation reflecting material, and a radiation absorbing material. In an embodiment of the radiation shield, the shielding capacity of the substrate alone is at least one order of magnitude lower compared to shielding capacity of the radiation shield.

An aspect of the invention described herein provides a method of forming a radiation shield, the method including:

- identifying a refractory metal and an absorbing material having radiation resistance properties;
- propelling a particulate form of the refractory metal onto a substrate at a velocity resulting in adherence of the propelled metal to the substrate to form a refractory layer; and propelling a particulate form of the absorbing material onto the refractory layer to form an absorbing layer, the refractory layer and absorbing layer having a complementary effect for shielding from particles emitted from a radiation source. In some embodiments of the method, propelling further includes identifying a propulsion velocity, nozzle size and carrier gas.

BRIEF DESCRIPTION OF DRAWINGS

FIG. 2 is a photograph of results from a Monte Carlo N-Particle Transport Code System (MCNP) 6.2 simulator for analyzing the effect of GCR on cold sprayed radiation shield.

DETAILED DESCRIPTION

Figure 1:
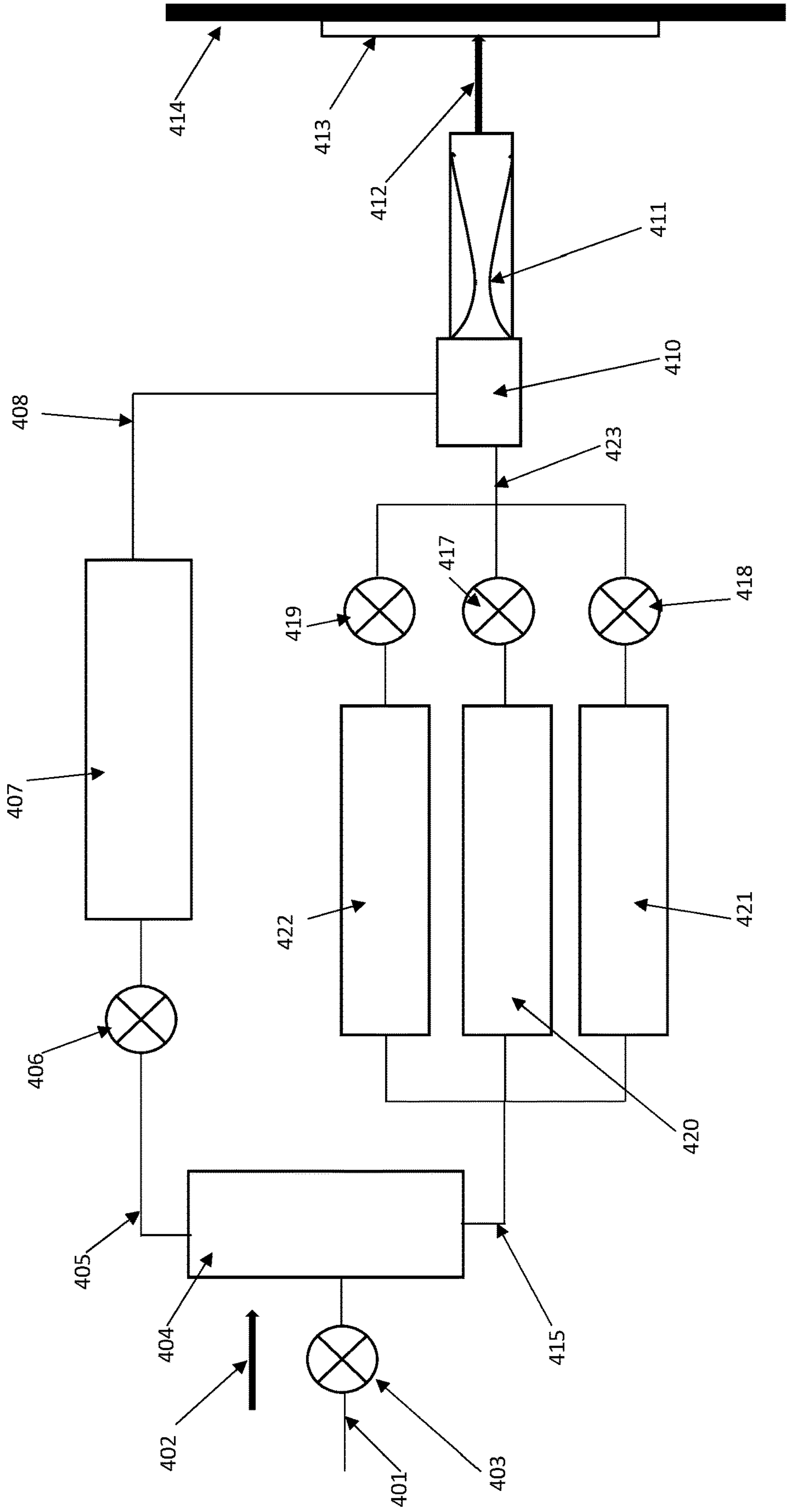
FIG. 1 is a schematic drawing of a cold spray apparatus.

The examples and aspects of inventions described herein provide a shield which is lightweight and highly effective at blocking GCR thereby solving a critical problem that costs the aerospace industry millions of USD annually. Cold spray additive manufacturing (CSAM) technologies, in the form of additively manufactured solutions, coatings, and or consolidations are used to combine dissimilar materials through highly kinetic and solid-state interactions to produce a shield that is lighter and significantly more effective at blocking single event GCR from impacting mission-critical components. The unique characteristics associated with CSAM are difficult or impossible to be achieved through traditional manufacturing methods therefore a cutting edge and innovative solution is used to protect spacecraft or vehicle destined for continued exposure to the harsh conditions of space.

The inventions described herein use cold spray additive manufacturing (CSAM) in form of coatings, consolidations, and/or additively manufactured structures as the most reasonable and reliable approach to address the unsolved problem of GCR-induced degradation of high-reliability components in space-bound vehicles in accordance with our national interests as the United States as well as the interests of our allies.

A CSAM consolidated GCR shield is thinner and lighter than conventional wrought, cast or sheet metal GCR shields. The CSAM process allows a particulate formulation and layered architecture in a complementary arrangement. The CSAM technology can be implemented to target flight specific missions allowing for customizable shields for particularly harsh environments, or light weighting for less aggressive flights associated with satellites and space-based vehicles. A method of forming the radiation shield includes identifying a GCR reflective metal and an absorbing material having radiation resistance properties and propelling a particulate form of the GCR reflective metal via CSAM onto a substrate at a velocity resulting in adherence of the propelled metal to the substrate to form a refractory layer. A successive layer is formed by propelling a particulate form of the absorbing material onto the reflective layer to form an absorbing layer, such that the reflective layer and absorbing layer have a complementary effect for shielding from highly energetic particles emitted from a GCR radiation source. A general layered architecture includes a reflective metal in front of an absorbing layer, such that the reflective layer can decelerate or slow down high energy particles, which the absorbing layer can then retain. Iteratively applying additional layers of particulate form a layered GCR shield with a plurality of layers as needed.

Formation of the layered composition includes identifying a powder blend for combining into the particulate form of at least the reflective and absorbing layers. The first layer may include a heavy metal-like substance such as tungsten carbide, and the absorbing layer may be, for example, titanium boride. Cold spray parameters may be selected by identifying a propulsion velocity, nozzle size, and carrier gas. The layers form by the impact of gas-propelled particles through a nozzle onto a substrate plate.

The substrate onto which the cold spray is applied may be a plate separable from the resulting layered radiation shield. Therefore, cold spray is effective even when the substrate is defined by an irregular contour, such as a curved cylindrical shape or other non-linear objects.

A particular feature of the cold spray is adherence to the substrate and successive layers in an absence of a binder. This allows the particle selection of each layer to be either a single pure metal or alloy or a precise mixture.

Conventional shields, such as aluminum, are typically cast and attached as a solid planar material. However, the cold sprayed particles may be comprised of heavy metals with a substantially high melting point such that casting is infeasible. For example, tantalum has a melting point in excess of 3000° F., presenting substantial obstacles to an effecting casting or formulation into a desired shape.

Any suitable powder/particulate combination may be selected for each layer, and a plurality of layers may be successively cold sprayed to build up a desired thickness and composition. The resulting radiation shielding aggregate layered structure generally need not be more than 1/16 inch thick and is more effective than a ½ inch conventional aluminum shield.

Galactic Cosmic Radiation

Galactic Cosmic Rays (GCR) are highly energetic background sources of energetic particles that constantly bombard Earth, orbits around Earth and space generally. GCR is a dominant source of radiation that is encountered aboard current spacecraft and future space missions within our solar system. The source of GCR is outside the solar system and from within our Milky Way galaxy. GCR is composed of the nuclei of atoms that have had their surrounding electrons stripped away and are traveling at nearly the speed of light.

GCR originate outside the solar system and are likely formed by explosive events such as supernovas. These highly energetic particles consist of essentially every element ranging from hydrogen, accounting for approximately 89% of the GCR spectrum, to uranium, which is found in trace amounts. These nuclei are fully ionized, such that all electrons have been stripped from these atoms. Therefore, these particles interact with and are influenced by magnetic fields. The strong magnetic fields of the Sun modulate the GCR flux and spectrum at Earth.

Over the course of a solar cycle the solar wind modulates the fraction of the lower-energy GCR particles such that a majority cannot penetrate to Earth near solar maximum. Near solar minimum, in the absence of many coronal mass ejections and their corresponding magnetic fields, GCR particles have easier access to Earth. Just as the solar cycle follows a roughly 11-year cycle, so does the GCR, with its maximum, however, coming near solar minimum. But unlike the solar cycle, where bursts of activity change the environment quickly, the GCR spectrum remains relatively constant in energy and composition, varying only slowly with time.

These charged particles are traveling at large fractions of the speed of light and have tremendous energy. When these particles hit the atmosphere, large showers of secondary particles are created with some even reaching the ground. These particles pose little threat to humans and systems on the ground, but they can be measured with sensitive instruments. The Earth's own magnetic field also works to protect Earth from these particles largely deflecting them away from the equatorial regions but providing little-to-no protection near the polar regions or above roughly 55 degrees magnetic latitude (magnetic latitude and geographic latitude differ due to the tilt and offset of the Earth's magnetic field from its geographic center). This constant shower of GCR particles at high latitudes can result in increased radiation exposures for aircrew and passengers at high latitudes and altitudes. Additionally, these particles can easily pass through or stop in satellite systems, sometimes depositing enough energy to result in errors or damage in spacecraft electronics and systems.

Upon launch, a satellite or spacecraft is most often placed in one of several particular orbits around Earth—or it might be sent on an interplanetary journey. A low Earth orbit (LEO) is an orbit that is relatively close to the surface of the Earth. It is generally at an altitude of less than 1000 km but could be as low as 160 km above surface of the Earth. Satellites in geostationary orbit (GEO) circle Earth above the equator from west to east following Earth's rotation—taking 23 hours 56 minutes and 4 seconds—by travelling at exactly the same rate as Earth. This makes satellites in GEO appear to be 'stationary' over a fixed position. To perfectly match Earth's rotation, the speed of GEO satellites should be about 3 km per second at an altitude of 35 786 km. This is much farther from Earth's surface compared to many satellites. Medium Earth orbit (MEO) comprises a wide range of orbits anywhere between LEO and GEO. It is similar to LEO in that it also does not need to take specific paths around Earth, and it is used by a variety of satellites with many different applications. Satellites in MEO and GEO are subject to impacts of outer Van Allen radiation belt. LEO satellites encounter the most intense particle fluxes in the South Atlantic Anomaly, which is the main region where spacecrafts receive the largest fraction of the radiation exposure during spaceflight missions.

Therefore, the type of radiation that the space vehicle will encounter depends on the final orbit destination of the vehicle.

MCNP 6.2

The examples described herein use Monte Carlo N-Particle Transport Code System (MCNP) for analyzing the novel technology. The software, MCNP 6.2, was provided by the Radiation Safety Information Computational Center and contributed by the Los Alamos National Laboratory of New Mexico. Additional nanomechanical characterization of the consolidated cold spray materials are performed by exclusively employing the suite of nanoindentation testing systems procured by Nanomechanics, Inc., a KLA Tecnor Company, which is based out of Oak Ridge, TN Additional bulk mechanical characterization of the consolidated cold sprayed materials are also performed by way of applying the Indentation Plastometer from Plastometrex, which is based in Cambridge, UK.

Monte Carlo N-Particle transport code system (MCNP) version 6.2 is a comprehensive software used to numerically analyze the degree of interaction between incident, high-energy, particles and the cold sprayed shielding materials of concern. The analytical program simulates the transport of photons, neutrons, and electrons ($z \leq 100$). The creation of an environment with an appropriate radiation source, a suitable sample, and a detector is made to emulate space conditions. MCNP 6.2 controls the transport of charged particles and is equipped with models for simulating GCR.

The file generated contains the geometric specifications, a description of the target materials and their cross-sectional evaluations, a location for the radiation source, and the location and characteristics of the radiation particle source. The files yield tallies, and depending upon the nature of the code, generate histories that reduce variances and improve efficiency. The tallies are the marker gauging the efficacy of the shield and allow for an "apples to apples" comparison between materials. The subsequent results are captured as a dose in the unit gray which is equal to 100 rad; in which a rad signifies absorbed radiation dosage.

In other words, the intent is to develop a "deck-of-cards;" where a card is a line of code and the collective cards embody a deck. As discussed before, an environment is generated for the sample to be computationally studied. A cell card is used to create surfaces or volumes, surfaces cards and macro bodies respectively, are first put into the deck to create the environment. Since the system is simulating space, the model uses vacuum conditions, and the bounds are considered infinite. Next, the sample is defined using surface cards to generate a volume. All the samples are cubic therefore, six surface cards define the volume.

To analyze the effect of how each material interacts with cosmic radiation particles based on the previous material, the different materials are layered as disks to provide a predictable interaction path. For example, to analyze how the cosmic radiation particles interacted with tungsten carbide after passing through aluminum boride the material disks are ordered such that the particle first passes through the aluminum boride, then the tungsten carbide, then finally a tally registers the energies associated with particles that made it through the material disks.

Each volume generated has associated material properties. Therefore, a material card is used to generate the material properties. Because the code being generated is intended to be used for future work in which materials may have varying compositions, the material cards are coded to be adjustable by weight percent.

The shield material conventionally used is an Aluminum alloy Al 6061 because Al 6061 is light, easy to process, and for all intents is simply made thicker to add protection.

Nanoindentation

Nanoindentation was initially applied to the analyze metal hardening via ion-implantation of highly charged atomic particles sourced from nitrogen as well as titanium and carbon atoms [Oliver, 2010; Pethica, 1988; Pethica 1983]. By way of employing the original nanoindenter, the hardening mechanisms at play with respect to the ions studied in their 1983 research facility were found to be consistent with leading conceptualizations of material mechanics and hardening mechanisms such as interstitial hardening and nitriding. Nanoindentation testing system provides an ability to capture hardness change as a function of submicron depths into a material.

Cold Spray

Cold spray is "a process whereby particles that are 1 to 100 μm are accelerated to speeds up to 1000 m/s or more by supersonic gas flow and then impact on the target substrate surface to form a dense coating" as expressed by Tan et al. [2018]. Cold spray allows for a combination of dissimilar materials that is well adhered to a respective substrate, mechanically interlocked, and metallurgically sound as an advanced material system. Moreover, cold spray can be further fine-tuned via parameter optimization in the pursuit of ever emergent and largely desired shielding abilities. The characteristics inherent to the process of cold spray consolidation address cosmic radiation shielding without additional post-processing and trial-and-error experimentation. Specifically, the retentive nature of solid-state particle deformation-based coatings achieve added radiation resistivity through the introduction of lattice defects (e.g., dislocation loops, dislocation screws etc.) which are known to resist radiation degradation.

Cold spray is a solid-state deposition process for dissimilar materials. A "deposit" is a bulk material or layer on a substrate. In some embodiments, the deposit is a coating. Cold spray methods use a spray gun that receives a high-pressure gas for example, helium, nitrogen, or air, and a feedstock of deposit material, for example, metals, refractory metals, alloys, or composite materials in powder form. The powder granules are introduced at a high pressure into a gas stream in the spray gun and emitted from a nozzle. The particles are accelerated to a high velocity in the gas stream that may reach a supersonic velocity. The gas stream may be heated. Typically, the gases are heated to less than the melting point of the particles to minimize in-flight oxidation and phase changes in the deposited material. Because of the relatively low deposition temperatures and very high velocities, cold spray processes allow depositing well-adhering, metallurgically bonded, dense, hard, and wear-resistant coatings.

The powder impacts the substrate at a high velocity. The kinetic energy of the powder causes the powder granules to deform and flatten on impact with the substrate. The flattening promotes a metallurgical, mechanical, or combination of metallurgical and mechanical bond with the substrate and results in a deposit on the substrate. One advantage of cold spraying methods is the negligible to nil phase change or oxidation of particles during flight and high adhesion strength of the bonded particles.

In some embodiments, Helium (He) is used to generate high velocities to make dense deposits of higher melting point materials. Changing some characteristics of the feedstock material, such as the microstructure and/or morphology to reduce particle strength, hardness, or the melting temperature (relative to such characteristics and properties for particles received after typical powder manufacturing processes) improves fidelity of the deposit by encouraging additional particle deformation, particle-to-particle mechanical bonding, particle-to-substrate mechanical bonding, and/or chemical bonding.

Cold spray includes a soft base and a hard base depending on the material used for deposition. The soft base includes metals such as aluminum, copper, nickel, zinc, cobalt, iron, titanium, silver, gold, chromium, tungsten, other metal and metal-like chemical compounds, and alloys thereof. The hard base includes non-metals such as ceramic, and boron. The ceramic hard phases include yttrium, europium, hafnium, bases in the form of borides, carbides, and nitrides which are subsequently processed to have a soft shell consistent with the softer alloys. The softer metal forms an envelope around the harder ceramic phase. This is designed to produce a more effective mode of deposition during the CSAM process.

An agglomerate includes a material powder suitable for the shield that is agglomerated on the surface of a substrate. The agglomerate powder includes a plurality of particles characterized by an average particle size of about 10 nm to about 10 μm. In some embodiments the agglomerate powder includes both soft base materials and hard base materials. In alternative embodiments, the agglomerate powder includes either soft base materials or hard base materials. In some embodiments, the substrate is coated with soft base material first and then coated with the hard base material. In alternative embodiments, the substrate is coated with hard base material first and then coated with soft base material. In some embodiments, multiple layers of soft base material and hard base material are coated on the substrate. In other embodiments, the A schematic of a typical cold spray apparatus is demonstrated in FIG. 1. Compressed gas from a gas supply is supplied along a pneumatic line 401 in the direction 402 via shut-off and control valve 403, gas distributor 404, hose 405, and valve 406, pre-heated to a desired temperature with an in-line heater 407 and directed to a mixing chamber 410 via hose 408. Agglomerate is added to one of multiple feed hoppers 420, 421 and 422, which are controlled by valves 417, 418, and 419, respectively. In some embodiments the cold spray apparatus contains only one feed hopper. The agglomerate is put into hopper 420 that is controlled by valve 417. In the coating process, compressed gas enters the hopper 420 and carries the agglomerate, via valve 417, to mixing chamber 410 through hose 423. In the mixing chamber 410, the agglomerate is mixed with the heated pressurized gas to provide a particle-gas stream. The particle-gas stream is accelerated into a supersonic jet by passing through a Laval nozzle, 411. Thus, the particle-gas stream obtains sufficient velocity in the direction 412 for the agglomerate to deposit the particles a substrate 414, forming a coating 413.

Grain Boundary Area Fractions

There is an interdependency between the efficacy of potential shielding material and said materials' concentration of grain boundaries housed within a standard volume fraction of shielding material. Stated differently, the direct correlation between a materials cross-sectional grain boundary area fraction and the same materials' ability to withstand extreme radiation environments has been shown to be consistent during various experimental sessions—as demonstrated by the scholarly findings reported within the advanced materials and metallurgy communities [Chang, 2013; Murry, 2017; Alsabbagh, 2013; Thibeault, 2017]. Mechanistically speaking, Mohamed et al. state that "Because grain boundaries act as sinks for irradiation-induced point defects, it was hypothesized that . . . [such] materials would possess enhanced radiation resistance compared to conventional micro-grained (MG) materials . . . [which follows from the] excess of short diffusion paths for irradiation-induced point defects to migrate and annihilate at grain boundaries . . . " [Mohamed, 2016].

Material Selection for "Light-Weighting"

The examples described herein provide examples of dissimilar materials that are processed together by cold spray. The dissimilar materials include materials having contrasting properties such that the materials cannot be manufactured together. Cold spray provides the ability to layer dissimilar materials which decreases weight of the radiation shield and increases efficiency of the shield to deflect high energy GCR.

Table I shows the composition of a conventional radiation shield made of Aluminum 6061. Table II shows a light-weight radiation shield having Aluminum 6061 as a substrate and cold sprayed with Tantalum, Aluminum boride, Tungsten carbide, and Titanium diboride. These materials and thickness of the materials is subject to change for optimization and specific requirements.

TABLE I

Aluminum 6061 composition (conventional radiation shield)

| Element | Percent Min | Percent Max |
|---|---|---|
| Aluminum, Al | 95.8 | 98.6 |
| Chromium, Cr | 0.04 | 0.35 |
| Copper, Cu | 0.15 | 0.4 |
| Iron, Fe | — | 0.7 |
| Magnesium, Mg | 0.8 | 1.2 |
| Manganese, Mn | — | 0.15 |
| Other (each) | — | 0.05 |
| Other (total) | — | 0.15 |
| Silicon, Si | 0.4 | 0.8 |
| Titanium, Ti | — | 0.15 |
| Zinc, Zn | — | 0.25 |

Density: 2.7 g/cc [0.0975 lb/in$^3$]
Length: 5 cm [1.9685 in]

TABLE I-continued

| Aluminum 6061 composition (conventional radiation shield) | | |
|---|---|---|
| Element | Percent Min | Percent Max |
| Height: 5 cm [1.9685 in] | | |
| Thickness: 0.3175 cm [0.125 in] | | |
| Total Mass: 21.4313 g [0.0472 lb] | | |

A 3.41% reduction in weight is observed with four 1 mm thick coatings of consolidated shielding materials deposited onto a 1/16th inch substrate compared to a 1/8th inch thick conventional shield. These materials are optimized to determine the efficacy of materials compared to cost and weight to obtain a better radiation shield.

Simulation of Efficacy (MCNP 6.2 Code)

In a simulation the impact of photons, neutrons, and electrons, on an Al 6061 shield which is modeled as a disk source distributing an even load onto the shield, with a tally reading the current through the material. In the first sample, the Al 6061 is 1/8th inch thick (a known minimum for electronic component shielding used in industry). The second sample is an Al 6061 substrate with the "applied coatings" as shown in Table II above is a 1/16th inch thick and has four 1 mm coatings, which were additively manufactured (FIG. 2).

TABLE II

| Aluminum substrate with consolidated coating radiation shield | | | | |
|---|---|---|---|---|
| Aluminum 6061 (substrate) | | | Aluminum Boride (pure) coating | |
| Element | Percent min (%) | Percent max (%) | Element | Percent (%) |
| Aluminum, Al | 95.8 | 98.6 | Aluminum, Al | 55.513 |
| Chromium, Cr | 0.04 | 0.35 | Boron, B | 44.486 |
| Copper, Cu | 0.15 | 0.4 | Density: 3.19 g/cc [0.1152461 lb/in$^3$] | |
| Iron, Fe | — | 0.7 | Length: 5 cm [1.9685 in] | |
| Magnesium, Mg | 0.8 | 1.2 | Height: 5 cm [1.9685 in] | |
| Manganese, Mn | — | 0.15 | Thickness: 0.01 cm [0.003937008 in] | |
| Other, Each | — | 0.05 | Mass: 0.798 g [0.00175 lb] | |
| Other, Total | — | 0.15 | Tungsten carbide (Pure)-coating | |
| Silicon, Si | 0.4 | 0.8 | Element | Percentage (%) |
| Titanium, Ti | — | 0.15 | Tungsten, W | 93.867 |
| Zinc, Zn | — | 0.25 | Carbon, C | 6.132 |
| Density: 2.7 g/cc [0.0975 lb/in$^3$] | | | Density: 15.63 g/cc [0.565 lb/in$^3$] | |
| Length: 5 cm [1.9685 in] | | | Length: 5 cm [1.9685 in] | |
| Height: 5 cm [1.9685 in] | | | Height: 5 cm [1.9685 in] | |
| Thickness: 0.15875 cm [0.0625 in] | | | Thickness: 0.01 cm [0.003937008 in] | |
| Mass: 10.7156 g [0.0236 lb] | | | Mass: 3.907 g [0.00861 lb] | |
| Tantalum (Pure)-coating | | | Titanium Diboride (Pure)-coating | |
| Element | | Percent (%) | Element | Percentage (%) |
| Tantalum, Ta | | 100 | Titanium, Ti | 68.884 |
| Density: 16.6 g/cc [0.599 lb/in$^3$] | | | Boron, B | 31.115 |
| Length: 5 cm [1.9685 in] | | | Density: 4.52 g/cc [0.565 lb/in$^3$] | |
| Height: 5 cm [1.9685 in] | | | Length: 5 cm [1.9685 in] | |
| Thickness: 0.01 cm [0.003937008 in] | | | Height: 5 cm [1.9685 in] | |
| Mass: 4.15 g [0.0236 lb] | | | Thickness: 0.01 cm [0.003937008 in] | |
| | | | Mass: 1.13 g [0.00249 lb] | |
| Total Mass: 20.7006 | | | | |

Cell card 1 represents Al 6061, cell card 2 represents Aluminum boride, cell card 3 represents Tungsten carbide, cell card 4 represents Tantalum, cell card 5 represents titanium diboride. The materials are modeled with bulk material properties and does not include diffusion between the materials. Cold spray has significantly more beneficial characteristics therefore, the comparison is very conservative. The results of the simulation demonstrated that the energy deposition into the shield with the "applied coatings" was observed to be approximately 17 times more compared to energy deposition of a conventional shield. As the photons, neutrons, and electrons strike the shield and collide with the elemental particles of the shield, they attenuate and generate a current which is recorded by the F1 tally.

The data show that a shield of Al 6061 having a thickness of 0.15875 cm (0.0625 inches) with four cold spray coatings of 1 mm each provided neutron protection that was equivalent to a shield of Al 6061 having a thickness of 1.27 cm (0.5 inches) or even 2.54 cm (1 inch). The particles of the simulation are high-z materials which are known to assist in stopping charged particles and protons. The combination of high-z elements provided by the shielding constituents and the relatively low-z elements alloyed into Al 6061 provide an expansive means of protection.

The code was written to simulate GCR for shield feasibility example and can be modified according to the specific conditions of space.

TABLE IIII

| Aluminum 6061 material declaration (soft phase) | | | | | | |
|---|---|---|---|---|---|---|
| Atomic Number | Symbol | Name | Atomic Weight (amu, g/mol) | Luvak Wt. Percent | Percent 70% Retention | MCNP Value |
| 25 | Mn | Manganese | 54.938 | 0.021 | 0.014700 | 0.000147 |
| 26 | Fe | Iron | 55.847 | 0.21 | 0.147000 | 0.001470 |
| 12 | Mg | Magnesium | 24.305 | 1 | 0.700000 | 0.007000 |
| 14 | Si | Silicon | 28.0855 | 0.67 | 0.469000 | 0.004690 |
| 29 | Cu | Copper | 63.546 | 0.26 | 0.182000 | 0.001820 |
| 30 | Zn | Zinc | 65.38 | 0.004 | 0.002800 | 0.000028 |
| 22 | Ti | Titanium | 47.9 | 0.014 | 0.009800 | 0.000098 |
| 24 | Cr | Chromium | 51.996 | 0.082 | 0.057400 | 0.000574 |
| 40 | Zr | Zirconium | 91.22 | 0.002 | 0.001400 | 0.000014 |
| 13 | Al | Aluminum | 26.98154 | 97.737 | 68.415900 | 0.684159 |

TABLE IV

| Tantalum pure material declaration (soft phase) | | | | | | |
|---|---|---|---|---|---|---|
| Atomic Number | Symbol | Name | Atomic Weight (amu, g/mol) | Luvak Wt. Percent | Percent 70% Retention | MCNP Value |
| 6 | C | Carbon | 12.011 | 0.002 | 0.001400 | 0.0000140 |
| 8 | O | Oxygen | 15.9994 | 0.03 | 0.021000 | 0.0002100 |
| 7 | N | Nitrogen | 14.0067 | 0.005 | 0.003500 | 0.0000350 |
| 1 | H | Hydrogen | 1.00797 | 0.009 | 0.006300 | 0.0000630 |
| 41 | Nb | Niobium | 92.9064 | 0.002 | 0.001400 | 0.0000140 |
| 26 | Fe | Iron | 55.847 | 0.0005 | 0.000350 | 0.0000035 |
| 22 | Ti | Titanium | 47.9 | 0.0005 | 0.000350 | 0.0000035 |
| 74 | W | Tungsten | 183.85 | 0.002 | 0.001400 | 0.0000140 |
| 42 | Mo | Molybdenum | 95.94 | 0.0005 | 0.000350 | 0.0000035 |
| 14 | Si | Silicon | 28.0855 | 0.0005 | 0.000350 | 0.0000035 |
| 28 | Ni | Nickel | 58.7 | 0.0005 | 0.000350 | 0.0000035 |
| 73 | Ta | Tantalum | 180.9479 | 99.9475 | 69.963250 | 0.6996325 |

TABLE V

| Copper Beryllium material declaration (soft phase) | | | | | | |
|---|---|---|---|---|---|---|
| Atomic Number | Symbol | Name | Atomic Weight (amu, g/mol) | ASTM Wt. Percent | Percent 70% Retention | MCNP Value |
| 4 | Be | Beryllium | 9.01218 | 1.90 | 1.330000 | 0.0133000 |
| 27 | Co | Cobalt | 58.9332 | 0.20 | 0.140000 | 0.0014000 |
| 29 | Cu | Copper | 63.546 | 97.90 | 68.530000 | 0.6853000 |

TABLE VI

| Europium Barium Copper Oxide material declaration (hard phase) | | | | | | | |
|---|---|---|---|---|---|---|---|
| Atomic Number | Symbol | Name | Atomic Weight (amu, g/mol) | Element Qty. | Elemental Mass | Percent | Percent 30% Retention |
| 63 | Eu | Europium | 151.96 | 1 | 151.96 | 0.208377 | 0.062513216 |
| 56 | Ba | Barium | 137.33 | 2 | 274.66 | 0.376632 | 0.11298947 |
| 29 | Cu | Copper | 63.546 | 3 | 190.638 | 0.261415 | 0.078424548 |
| 8 | O | Oxygen | 15.9994 | 7 | 111.9958 | 0.153576 | 0.046072766 |

TABLE VII

| Aluminum boride material declaration (hard phase) | | | | | | | |
|---|---|---|---|---|---|---|---|
| Atomic Number | Symbol | Name | Atomic Weight (amu, g/mol) | Element Qty. | Elemental Mass | Percent | Percent 30% Retention |
| 13 | Al | Aluminum | 26.98154 | 1 | 26.98154 | 0.555158 | 0.166547439 |
| 5 | B | Boron | 10.81 | 2 | 21.62 | 0.444842 | 0.133452561 |

TABLE VIII

| Hafnium Di-Boride Material Declaration (Hard Phase) | | | | | | | |
|---|---|---|---|---|---|---|---|
| Atomic Number | Symbol | Name | Atomic Weight (amu, g/mol) | Element Qty. | Elemental Mass | Percent | Percent 30% Retention |
| 72 | Hf | Hafnium | 178.49 | 1 | 178.49 | 0.891959 | 0.267587827 |
| 5 | B | Boron | 10.81 | 2 | 21.62 | 0.108041 | 0.032412173 |

TABLE IX

| Tungsten Material Composition (Hard Phase) | | | | | | | |
|---|---|---|---|---|---|---|---|
| Atomic Number | Symbol | Name | Atomic Weight (amu, g/mol) | Element Qty. | Elemental Mass | Percent | Percent 30% Retention |
| 74 | W | Tungsten | 183.85 | 1 | 183.85 | 0.938676 | 0.281602769 |
| 6 | C | Carbon | 12.011 | 1 | 12.011 | 0.061324 | 0.018397231 |

In another embodiment pure tantalum is coupled europium barium copper oxide, copper beryllium with the hafnium diboride, aluminum 6061 with tungsten carbide, and an additional copper beryllium with aluminum boride (Table III-Table IX). The materials are selected based on nucleus cross sectional area and electron density. These materials have relatively high ratios of nucleus cross sectional area and electron density. Therefore, are exceptional candidates for shielding.

The inventions described herein are the most practical methods, it is recognized, however, that departures may be made within the scope of the invention and that modifications will occur to a person skilled in the art. With respect to the above description then, it is to be realized that the optimum dimensional relationships for the parts of the invention, to include variations in size, materials, shape, form, function, steps, and manner of operation, assembly and use, would be apparent to one skilled in the art, and all equivalent relationships to those illustrated in the drawings and described in the specification are intended to be encompassed by the present inventions.

Therefore, the foregoing is considered as illustrative only of the principles of the invention. Further, since numerous modifications and changes will readily occur to those skilled in the art, it desired to limit the invention to the exact construction and operation shown and described, and accordingly, all suitable modifications and equivalents may be resorted to, falling within the scope of the invention.

REFERENCES & BIBLIOGRAPHY

1. Hall A C, Brewer L N, Roemer T J. Preparation of aluminum coatings containing homogenous nanocrystalline microstructures using the cold spray process. J Therm Spray Technol. 2008; 17(3):352-359.
2. Kim W J, Kim J K, Park T Y, et al. Enhancement of strength and superplasticity in a 6061 al alloy processed by equal-channel-angular-pressing. Metallurgical and materials transactions A. 2002; 33(10):3155-3164.
3. Soltani Z, Beigzadeh A, Ziaie F, Asadi E. Effect of particle size and percentages of boron carbide on the thermal neutron radiation shielding properties of HDPE/B4C composite: Experimental and simulation studies. Radiat Phys Chem. 2016; 127:182-187.
4. Alsabbagh A, Valiev R Z, Murty K L. Influence of grain size on radiation effects in a low carbon steel. J Nucl Mater. 2013; 443(1-3):302-310.
5. Ziegler J F. Ion implantation science and technology. Elsevier; 2012.
6. Biersack J P, Ziegler J F. The stopping and range of ions in solids. In: Ion implantation techniques. Springer; 1982: 122-156.
7. Biersack J P, Ziegler J F. The stopping and range of ions in solids. In: Ion implantation techniques. Springer; 1982: 122-156.
8. Williams E J. Nature of the high energy particles of penetrating radiation and status of ionization and radiation formulae. Physical Review. 1934; 45(10):729.
9. Kang H, Kang S B. Tungsten/copper composite deposits produced by a cold spray. Scr Mater. 2003; 49(12):1169-1174.
10. Gyulassy M, Wang X. HIJING 1.0: A Monte Carlo program for parton and particle production in high energy hadronic and nuclear collisions. Comput Phys Commun. 1994; 83(2-3):307-331.
11. Chen H, Pala Z, Hussain T, McCartney D G. Fabrication and microstrain evolution of al-TiB2 composite coating by cold spray deposition. Proceedings of the institution of mechanical engineers, Part L: Journal of Materials: Design and Applications. 2017:1464420717690559.

12. Brinkman J A. Production of atomic displacements by high-energy particles. American Journal of Physics. 1956; 24(4):246-267.
13. Brandelik R, Braunschweig W, Gather K, et al. Rapid growth of charged particle multiplicity in high energy e e— annihilations. Physics Letters B. 1980; 89(3-4):418-422.
14. Birkel M, Sarkar S. Extremely high energy cosmic rays from relic particle decays. Astroparticle Physics. 1998; 9(4):297-309.
15. Shea H R. Effects of radiation on MEMS. 2011; 7928: 79280E.
16. Bedingfield K L, Leach R D, Alexander M B. NASA reference publication 1390. 1996.
17. Oliver W C, Pharr G M. An improved technique for determining hardness and elastic modulus using load and displacement sensing indentation experiments. Journal of Materials Research. 1992; 7(6):1564-1583.
18. Simpson J A. Elemental and isotopic composition of the galactic cosmic rays. Annual Review of Nuclear and Particle Science. 1983; 33(1):323-382.
19. Gaisser T K, Engel R, Resconi E. Cosmic rays and particle physics. Cambridge University Press; 2016.
20. Bulychev S I, Alekhin V P, Shorshorov M K, Ternovskij A P, Shnyrev G D. Determination of young modulus by the hardness indentation diagram. Zavodskaya Laboratoriya. 1975; 41(9):1137-1140.
21. Sneddon I N. The relation between load and penetration in the axisymmetric boussinesq problem for a punch of arbitrary profile. International Journal of Engineering Science. 1965; 3(1):47-57.
22. Stilwell N A, Tabor D. Elastic recovery of conical indentations. Proceedings of the Physical Society. 1961; 78(2):169-179.
23. Oliver W C, Pharr G M. Nanoindentation in materials research: Past, present, and future. MRS Bulletin. 2010; 35(11):897-907.
24. Pethica J B, Oliver W C. Mechanical properties of nanometre volumes of material: Use of the elastic response of small area indentations. MRS Online Proceedings Library. 1988; 130.
25. Pethica J B, Hutchings R, Oliver W C. Composition and hardness profiles in ion-implanted metals. Nuclear Instruments and Methods In Physics Research. 1983; 209:995-1000.
26. Alsabbagh, Ahmad, Ruslan Z. Valiev, and K. L. Murty. "Influence of grain size on radiation effects in low carbon steel." Journal of Nuclear Materials 443.1-3 (2013): 302-310.
27. Chang, Yong-Qin, et al. "Irradiation effects on nanocrystalline materials." Frontiers of Materials Science 7.2 (2013): 143-155.
28. Mohamed, Walid et al. "The Role of Grain Size on Neutron Irradiation Response of Nanocrystalline Copper" Materials (Basel, Switzerland) vol. 9, 3 144. 1 Mar. 2016
29. Murty, Korukonda Linga. "Creep, Deformation and Fracture Studies of Materials for Various Technologies in the Nuclear Materials Research Group at NC State." Mechanical and Creep Behavior of Advanced Materials. Springer, Cham, 2017. 3-18.
30. Thibeault, Sheila A., et al. "Nanomaterials for radiation shielding." MRS Bulletin 40.10 (2015): 836-841.

What is claimed is:

1. A method for manufacturing a radiation shield, the method comprising:

identifying a substrate for the radiation shield;

identifying at least one material including a refractory metal for cold spray deposition on the substrate; and applying by cold spray deposition a coating of the at least one material on the substrate thereby obtaining a radiation shield.

2. The method according to claim 1 further comprising applying a plurality of coatings of the at least one material on the substrate.

3. The method according to claim 1 further comprising transforming the at least one material in a powder blend.

4. The method according to claim 1 further comprising applying a binder on the substrate prior to applying the at least one material.

5. The method according to claim 1 identifying the at least one material further comprises identifying at least one hard base material and at least one soft base material.

6. The method according to claim 5 further comprising applying by cold spray to the substrate the coating of at least one of: the soft base material, and the hard base material.

7. The method according to claim 6 further comprising layering the coating of the soft base material followed by the coating of hard base material.

8. The method according to claim 1, the substrate is at least one selected from: aluminum, tungsten, tin, lead, bismuth, zinc, and alloys thereof.

9. The method according to claim 5, the soft base material for cold spraying is at least one selected from: copper, tungsten, aluminum, titanium, iron, magnesium, manganese, tantalum, chromium, europium, gallium, indium, thallium, nihonium, flerovium, moscovium, livermorium, cobalt, nickel, zinc, platinum, silver, gold, and alloys thereof.

10. The method according to claim 5, the hard base material for cold spraying is at least one selected from: silicate, carbide, boride, nitride, silicon, boron, germanium, arsenic, antimony, tellurium, polonium, and combinations thereof.

11. A radiation shield comprising:

a substrate having a cold sprayed coating of at least one material, the substrate selected from: an aluminum alloy, a titanium alloy, a lead alloy, stainless steel, a copper alloy, a brass alloy, and any combination thereof.

12. The radiation shield according to claim 11, the aluminum alloy is selected from: Al 1420, Al 1421, Al 2004, Al 2017, Al 2020, Al 2024, Al 2029, Al 2055, Al 2080, Al 2090, Al 2091, Al 2095, Al 2099, Al 2195, Al 2519, Al 2055, Al 5024, Al 5052, Al 5652, Al 2055, Al 6013, Al 6061, Al 6113, Al 7010, Al 7039, Al 7049, Al 7050, Al 7055, Al 7065, Al 7068, Al 7075, Al 7175, Al 7085, Al 7093, Al 7150, Al 7178, Al 7255, Al 7475, Al 8009, and Al 8019.

13. The radiation shield according to claim 12, the aluminum alloy has a thickness of: 0.01 mm to 0.1 mm, from 0.1 mm to 1 mm, from 1 mm to 2 mm, from 2 mm to 3 mm, 3 mm to 4 mm, 4 mm to 5 mm, or 5 mm to 10 mm.

14. The radiation shield according to claim 11, the cold spray coating has a thickness of: 0.01 mm to 0.1 mm, from 0.1 mm to 0.5 mm, from 0.5 mm to 1 mm, from 1 mm to 1.5 mm, from 1.5 mm to 2 mm, from 2 mm to 3 mm, 3 mm to 4 mm, 4 mm to 5 mm, or 5 mm to 10 mm.

15. The radiation shield according to claim 11, the material further comprises a hard base material, and a soft base material.

16. The radiation shield according to claim 11, the material further comprises a radiation refractory material, and a radiation absorbing material.

17. The radiation shield according to claim 11, shielding capacity of the substrate alone is at least one order of magnitude lower compared to shielding capacity of the radiation shield.

18. A method of forming a radiation shield, the method comprising:

identifying a refractory metal and an absorbing material having radiation resistance properties;

propelling a particulate form of the refractory metal onto a substrate at a velocity resulting in adherence of the propelled metal to the substrate to form a refractory layer; and propelling a particulate form of the absorbing material onto the refractory layer to form an absorbing layer, the refractory layer and absorbing layer having a complementary effect for shielding from particles emitted from a radiation source.

19. The method according to claim 18, propelling further comprises identifying a propulsion velocity, nozzle size and carrier gas.

* * * * *